United States Patent
Marsh

(10) Patent No.: US 10,621,231 B2
(45) Date of Patent: Apr. 14, 2020

(54) GENERATION OF A TOPIC INDEX WITH NATURAL LANGUAGE PROCESSING

(71) Applicant: Google LLC, Mountain View, CA (US)

(72) Inventor: Brian David Marsh, Seattle, WA (US)

(73) Assignee: Google LLC, Mountain View, CA (US)

( * ) Notice: Subject to any disclaimer, the term of this patent is extended or adjusted under 35 U.S.C. 154(b) by 671 days.

(21) Appl. No.: 14/833,599

(22) Filed: Aug. 24, 2015

(65) Prior Publication Data

US 2017/0060917 A1 Mar. 2, 2017

(51) Int. Cl.
*G06F 16/783* (2019.01)
*G06F 16/432* (2019.01)

(52) U.S. Cl.
CPC ........ *G06F 16/7844* (2019.01); *G06F 16/433* (2019.01)

(58) Field of Classification Search
CPC .... G06F 16/70; G06F 16/783; G06F 16/7844; G06F 16/7837; G06F 16/7867; G06F 16/7328; G06F 16/739; G06F 16/743; G06F 16/433
See application file for complete search history.

(56) References Cited

U.S. PATENT DOCUMENTS

| | | | |
|---|---|---|---|
| 6,434,520 B1 | 8/2002 | Kanevsky et al. | |
| 7,640,272 B2 | 12/2009 | Mahajan et al. | |
| 7,801,910 B2 | 9/2010 | Houh et al. | |
| 8,392,409 B1 | 3/2013 | Kashyap et al. | |
| 8,423,555 B2 * | 4/2013 | Ambwani | G06F 17/30029 707/746 |
| 8,756,233 B2 | 6/2014 | AbdAlmageed et al. | |
| 9,467,744 B2 * | 10/2016 | Zhang | H04N 21/4756 |
| 2007/0055695 A1 | 3/2007 | Dorai et al. | |
| 2011/0289088 A1 | 11/2011 | Yarin et al. | |
| 2012/0197750 A1 * | 8/2012 | Batra | G06F 17/30592 705/26.7 |

(Continued)

FOREIGN PATENT DOCUMENTS

| | | |
|---|---|---|
| CN | 107636651 | 1/2018 |
| EP | 3341857 | 7/2018 |
| KR | 10-2017-0134588 | 12/2017 |

OTHER PUBLICATIONS

Anonymous, Google I/O 2013 Keynote Transcript, Jun. 2014. Retrieved from Internet: https://singjupost.com/google-io-2013-keynote-transcript/?singlepage=1; (Year: 2013).*

(Continued)

*Primary Examiner* — James Trujillo
*Assistant Examiner* — Cheryl M Shechtman
(74) *Attorney, Agent, or Firm* — IP Spring

(57) ABSTRACT

Systems and methods generate a topic index for a conversational event and generate a content item based on the topic index. A processing device extracts a plurality of topics from a first content item corresponding to the conversational event, and generates the topic index for the conversational event. The topic index associates each of the plurality of topics with a content segment from the first content item. The method identifies a subset of one or more topics within the plurality of topics, and generates a second content item including a respective content segment of each of the one or more topics of the subset of one or more topics.

20 Claims, 10 Drawing Sheets

(56) References Cited

U.S. PATENT DOCUMENTS

| | | | |
|---|---|---|---|
| 2012/0224021 A1* | 9/2012 | Begeja | H04N 7/147 348/14.08 |
| 2012/0272160 A1 | 10/2012 | Spivack et al. | |
| 2015/0181301 A1* | 6/2015 | Bloch | H04N 21/47217 725/41 |
| 2015/0193482 A1* | 7/2015 | Kaushansky | G06F 16/35 707/741 |

OTHER PUBLICATIONS

Youtube vide entitled "Google I/O 2013: Keynote", uploaded on May 15, 2013 by user "Google Developers", Retrieved from Internet: <https://www.youtube.com/watch?v=9pmPa_KxsAM> (Year: 2013).*

Atta Badii, et al., Semi-Automatic Annotation and Retrieval of Visual Content Using the Topic Map Technology, Proceedings of the 1st WSEAS International Conference on Visualization, Imaging and Simulation (VIS'08), ISSN: 1790-2769, IDBN: 978-960-474-022-2.

International Search Report and Written Opinion for PCT/US2016/048187, dated Nov. 14, 2016, 10 pages.

KIPO, Notice of Preliminary Rejection for Korean Patent Application No. 10-2017-7031686, dated Dec. 3, 2018, 5 pages.

EPO, International Preliminary Report on Patentability for International Patent Application No. PCT/US2016/048187, dated Feb. 27, 2018, 6 pages.

KIPO, Notice of Allowance (with English translation) for Korean Patent Application No. 10-2017-7031686, dated Aug. 27, 2019, 3 pages.

EPO, Commnication Pursuant to Article 94(3) EPC for European Patent Application No. 16758067.9, dated Dec. 10, 2019, 7 pages.

* cited by examiner

GENERATION OF A TOPIC INDEX WITH NATURAL LANGUAGE PROCESSING

TECHNICAL FIELD

This disclosure relates to the field of conferencing, and in particular, to generating a topic index for a conversational event.

BACKGROUND

Conversational events, such as media collaborations over the Internet (e.g., video conferences, telemedicine, etc.) are becoming increasingly common as broadband access and applications that take advantage of broadband connectivity proliferate. Applications for supporting conversational events may be browser-based, or may run independently of a browser.

SUMMARY

The following presents a simplified summary of various aspects of this disclosure in order to provide a basic understanding of such aspects. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the present disclosure, a method includes extracting, by a processing device, a plurality of topics from a first content item corresponding to the conversational event, and generating the topic index for the conversational event. The topic index associates each of the plurality of topics with a content segment from the first content item. The method further includes identifying a subset of one or more topics within the plurality of topics, and generating a second content item including a respective content segment of each of the one or more topics of the subset of topics.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The present disclosure is illustrated by way of example, and not by way of limitation, in the figures of the accompanying drawings, in which.

DETAILED DESCRIPTION

Figure 1:
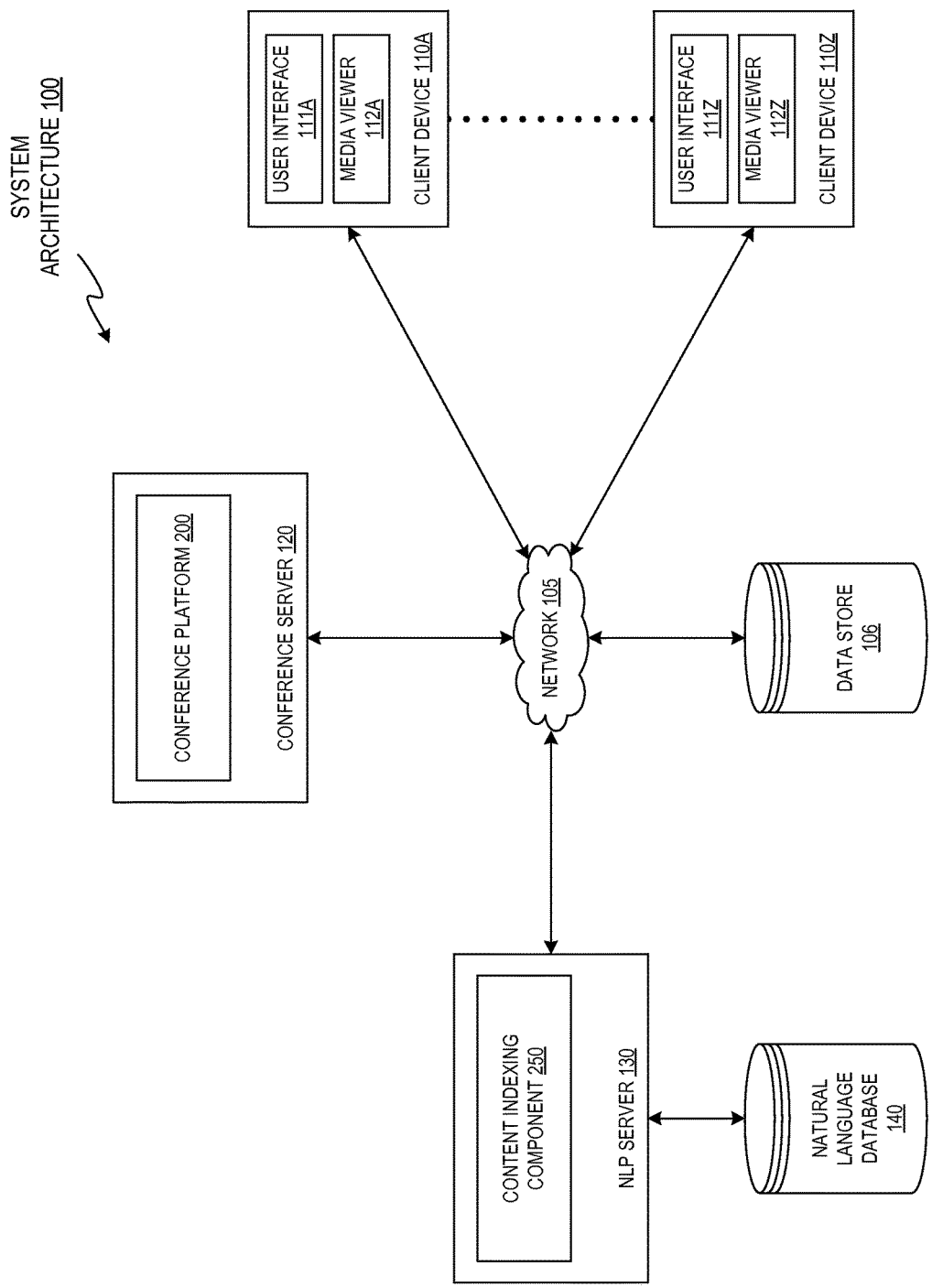
FIG. 1 illustrates an example system architecture in accordance with an implementation of the disclosure.

Aspects and implementations of the present disclosure are directed to generating topic indices for conversational events based on natural language processing techniques. The systems and methods disclosed can be applied to live content, pre-recorded content, and media collaborations. Live content refers to content that is broadcast or streamed in real-time (e.g., with or without unintended delay, or within a specified time constraint (e.g., under 50 microseconds) from the creation of content). Pre-recorded content refers to content that is broadcast or streamed with an intended delay from its creation time (e.g., there is no specified time constraint between the content creation and the content broadcasting or streaming). Media collaborations (e.g., audio and/or video conferences, audio and/or video chats, audio and/or video conference rooms, audio and/or video chat rooms, etc.) refer to communications between participants/users, in which content/media streams (e.g., live audio and/or video content, recorded audio and/or video content, etc.) are transmitted by devices of one or more participants/users, and may be combined into a composite content/media stream.

As used herein, the term "conversational event" refers to a conversation held between two or more users in which spoken and/or written language of the conversation is exchanged between the two or more users using respective client devices of the two or more users. Conversational events may include live or pre-recorded content and may be in the form of media collaborations such as video and/or audio conferences, text-based chats, slideshow presentations, online lectures/seminars, short message service communications, audio communications, etc.

As used herein, the term "content item" includes audio clips, movie clips, TV clips, and music videos, as well as content such as video blogging, short original videos, pictures, photos, other multimedia content, etc. Content items may also refer to other types of content, including representations of products (e.g., product listings from online merchants), articles (e.g., reviews, news articles, product descriptions, etc.), chat dialog, slideshow presentations, or any other type of contextual data that may be presented using a display and/or audio device.

Described herein in various implementations are technologies that allow for the extraction of topics from conversational events using natural language processing (NLP) techniques. NLP is used to perform topic extraction from content associated with a conversational event (e.g., live video/audio streams, pre-recorded video/audio streams, text-based conversations, etc.). For example, spoken or typed language can be parsed into conceptual topics using various knowledge extraction technologies. The topics can be used to generate a topic index, which in turn may be used to find interesting portions of the content associated with the conversational event. The topics can also be used to build a "master" topic index for collections of conversational events such that keyword searches can return to those videos and/or portions of videos that are related to topics of interest. In addition, the topic indices can be used to generate recommendations for content, generate highlight reels of conversational events, montages of multiple conversational events, etc.

Some implementations described herein may be integrated into user interfaces operated on various client devices. A user interface may display video content in one portion and also display a list of indexed topics. For a live video stream, the list may update in real-time as NLP extracts topics from the video stream. In some implementations, a user/participant of the conversational event can click on the topics in the list, which may result in the video stream starting from a time corresponding to when the topic was discussed.

Accordingly, the implementations provide several advantages, including, but not limited to, indexing a conversational event in real-time as the conversational event is occurring, indexing and identifying portions of the conversational event automatically without input from an editor, and utilizing direct or indirect feedback from participants of conversational events to facilitate indexing.

FIG. 1 illustrates an example system architecture 100, in accordance with an implementation of the disclosure. The system architecture 100 includes client devices 110A-110Z, a network 105, a data store 106, a conference server 120, a natural language processing (NLP) server 130, and a natural language database 140. Each of the various devices of the system architecture 100 may be connected to one another via the network 105. In one implementation, the network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In some implementations, the data store 106 may be cloud-based. One or more of the devices of system architecture 100 may utilize the data store 106 to store public and private data, and data store 106 may be configured to provide secure storage for private data. The data store 106 may be part of or distributed between any of the client devices 110A-110Z, the conference server 120, and the NLP server 130.

In one implementation, the client devices 110A-110Z may include one or more computing devices such as personal computers (PCs), laptops, mobile phones, smart phones, tablet computers, netbook computers etc. Client devices 110A-110Z may also be referred to as "user devices" or "mobile devices". An individual user may be associated with (e.g., own and/or use) one or more client devices (e.g., one or more of client devices 110A-110Z). Client devices 110A-110Z may each be owned and utilized by different users at different geographical locations. Users that participate in media collaborations (e.g., video conferences) may be referred to herein as "conference participants".

The client devices 110A-110Z may each implement the user interfaces 111A-111Z, respectively. Each of user interfaces 111A-111Z may allow a user of the respective client device 110A-110Z to send and receive information to one or more of the conference server 120 and the NLP server 130. For example, one or more of the user interfaces 111A-111Z may be a web browser interface that can access, retrieve, present, and/or navigate content (e.g., web pages such as Hyper Text Markup Language (HTML) pages) provided by the conference server 120. In one implementation, one or more of the user interfaces 111A-111Z may be a standalone application (e.g., a mobile app, conferencing software, etc.), that allows a user of a respective client device 110A-110Z to send and receive information to the conference server 120 and/or the NLP server 130. In one implementation, one or more of the user interfaces 111A-111Z may be conference interfaces that allow conference participants to engage in one or more of video conferencing, audio conferencing, chatting, and or instant messaging. An example user interface (e.g., a graphical user interface window) is described in greater detail with respect to FIG. 4.

Each client device 110A-110Z further includes a media viewer 112A-112Z, espectively. In one implementation, the media viewers 112A-112Z may be applications that allow users to view content, such as images, videos, web pages, documents, etc. For example, the media viewer 112A may be a web browser that can access, retrieve, present, and/or navigate content (e.g., web pages such as Hyper Text Markup Language (HTML) pages, digital media items, etc.) served by a web server. The media viewer 112A may render, display, and/or present the content to a user. The media viewer 112A may also display an embedded media player that is embedded in a web page (e.g., a web page that may provide information about a product sold by an online merchant). In another example, the media viewer 112A may be a standalone application (e.g., a mobile app) that allows users to view digital media items (e.g., digital videos, digital images, electronic books, etc.). In one implementation, media viewers 112A-112Z may further allow for video to be received from one or more sources and displayed within the respective user interfaces 111A-111Z. For example, client device 110A may receive video data from the conference server 120, which may correspond to video streams generated by one or more additional client devices. The media viewer 112A may generate for display (e.g., within the user interface 111A) video corresponding to each of the video streams based on the received video data. In some implementations, user interfaces 111A-111Z are integrated with media viewers 112A-112Z, respectively.

In one implementation, the conference server 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, hardware components, or combinations thereof that may be suitable for implementing the various features described herein. In some implementations, the conference server 120 can enable media collaboration services such as audio and/or video conferences (e.g., among users of client devices 110A-110Z) using, for example, streaming video or voice over IP (VoIP) technologies and may be used for personal, entertainment, business, educational or academically-oriented interactions. The conference server 120 may be dedicated to providing video conferencing services or may provide video conferencing services along with other services including, for example, news services, social networking services and/or content hosting services.

Figure 2:
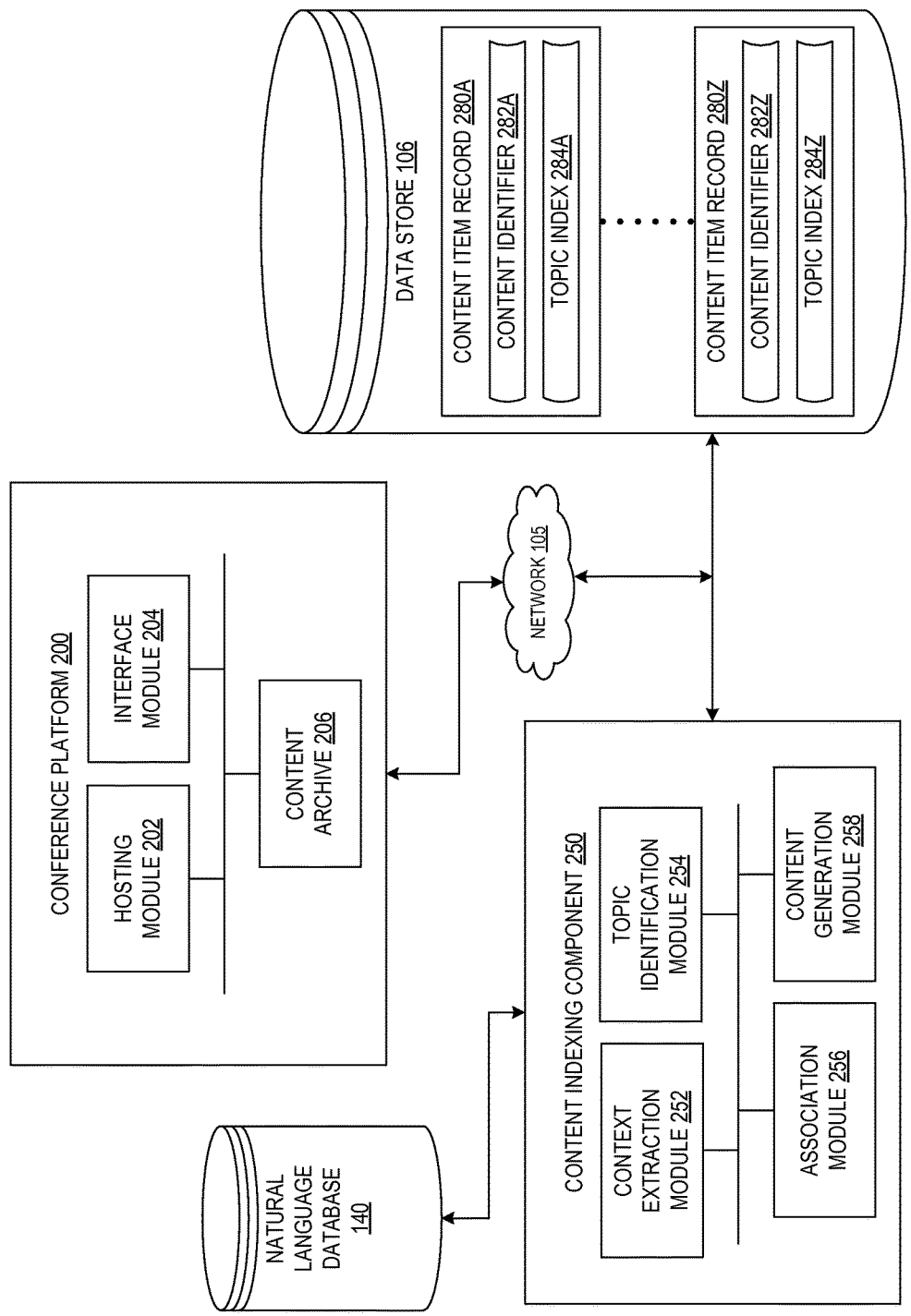
FIG. 2 is a block diagram illustrating a conference platform and a content indexing component in accordance with an implementation of the disclosure.

In one implementation, the conference server 120 includes a conference platform 200. The conference platform 200, as illustrated in FIG. 2, includes a hosting module 202, an interface module 204, and a content archive 206. More or less components may be included in the conference platform 200 without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.).

In one implementation, the hosting module 202 may be utilized by the conference platform 200 to initiate and support media collaborations, such as audio/video conferences, chat rooms, video chats, etc. For example, the hosting module 202 may receive requests from users to create media collaboration sessions, may allow users to join pre-existing media collaboration sessions upon receiving requests from the users, may facilitate transmitting invitations to users that permit the users to join pre-existing media collaboration sessions, etc.

Figure 6:
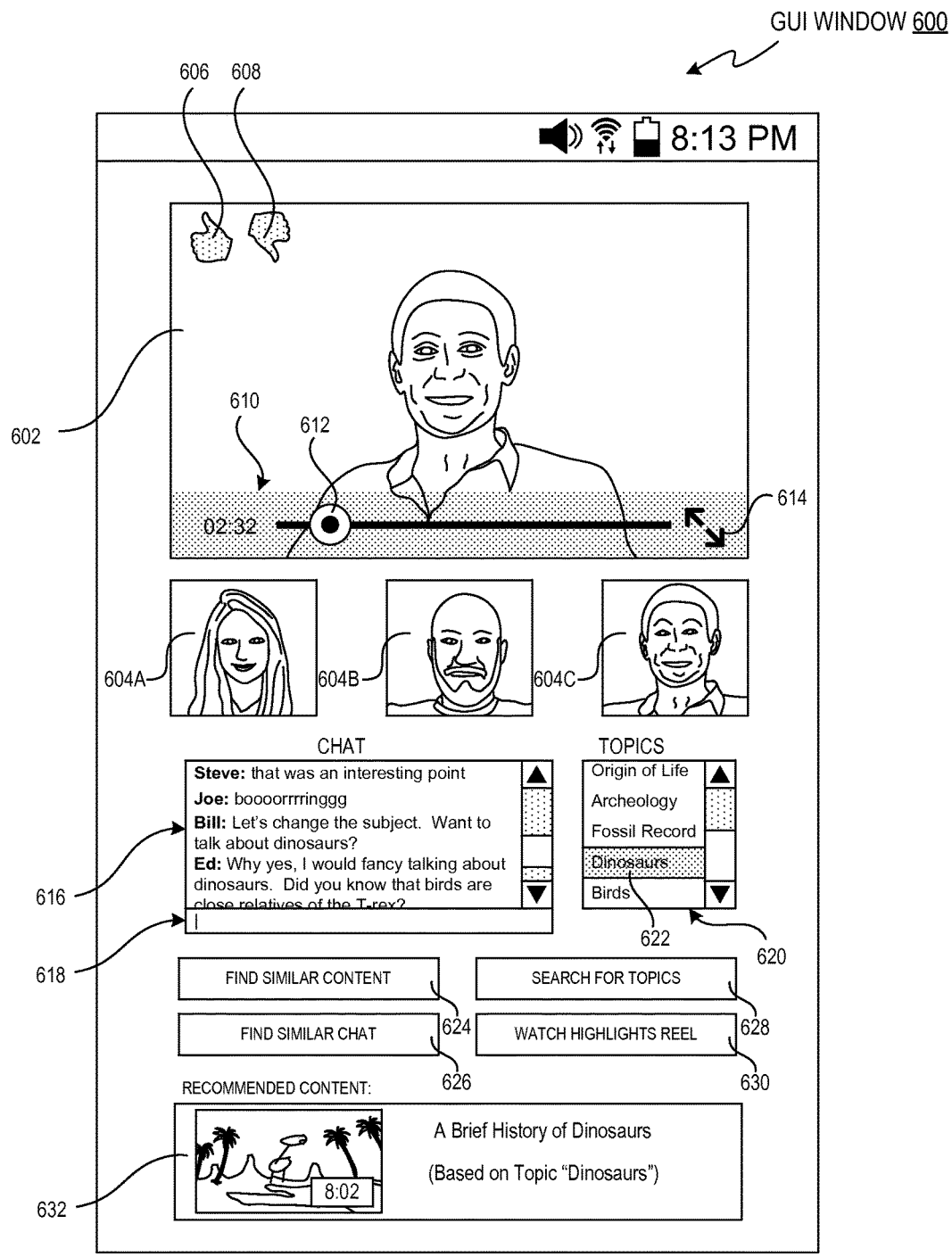
FIG. 6 is a block diagram illustrating a media collaboration interface in accordance with an implementation of the disclosure.

In one implementation, the interface module 204 may be utilized by the conference platform 200 to receive multiple audio and/or video streams from one or more of the client devices 110A-110Z of various participants, and generate a composite stream that may include data associated with each of the received streams. The composite stream may then be provided to the one or more client devices 110A-110Z of the various participants in a media collaboration session (e.g., a video conference). In some implementations, the composite stream may include formatting data that can be used by the client devices 110A-110Z for extracting individual video streams and arranging the video streams for presentation by respective user interfaces 111A-111Z. Accordingly, each user/participant of a video conference can simultaneously view some or all of the content streams within a single interface/screen, as illustrated in FIG. 6.

In some implementations, one or more participants in a media collaboration hosted by the conference platform 200 may provide/project audio content (e.g., a spoken voice of a participant, music, etc.) which, upon being received/perceived by a client device (e.g., one of client devices 110A-110Z), can be transmitted or otherwise provided by the client device as an audio stream that can be incorporated into the media collaboration. In some implementations, such audio streams can be provided independent of a video stream (e.g., a participant providing audio-only input during a media collaboration), while in other implementations such audio streams can be provided in conjunction with a video stream (e.g., a combined stream, incorporating synchronized video and audio of a participant speaking).

In one implementation, the content archive 206 may be utilized by the conference platform 200 to store media collaboration data (e.g., store video and/or audio stream data, chat data, etc.), which may be accessible by one or more participants via their respective client devices at a later time. In some implementations, the content archive may be combined with the data store 106. The content archive may store content associated with public conversational events (e.g., public video chats, public audio chats, public text-based chats, public presentations, etc.), such that the public conversational events are searchable and retrievable at a later time.

In one implementation, the NLP server 130 illustrated in FIG. 1 includes a content indexing component 250. The content indexing component 250, as illustrated in FIG. 2, includes a content extraction module 252, a topic identification module 254, an association module 256, and a content generation module 258. More or less components may be included in the content indexing component 250 without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.).

In one implementation, the content extraction module 252 and the topic identification module 254 may be utilized by the content indexing component 250 to identify topics of conversation within a conversational event. The content extraction module 252, for example, may be utilized to transcribe audio into text from which topic identifiers are extracted by the topic identification module 254. Various algorithms/techniques may be utilized for identifying and extracting contextual information from spoken and written language, including, but not limited to, speech recognition and processing, speech segmentation, topic segmentation, and word segmentation and disambiguation. In some implementations, the content indexing component 250 may access a natural language database 140 illustrated in FIG. 1, which may include a database of words and phrases to facilitate topic extraction/identification.

In one implementation, the association module 256 may be utilized by the content indexing component 250 to associate portions/segments of content items with identified topics. The association may be made by generating one or more content item records 280A-280Z (e.g., which are stored in the data store 106). Each of the content records 280A-280Z includes a respective content identifier 282A-282Z and a respective topic index 284A-284Z.

Figure 3B:
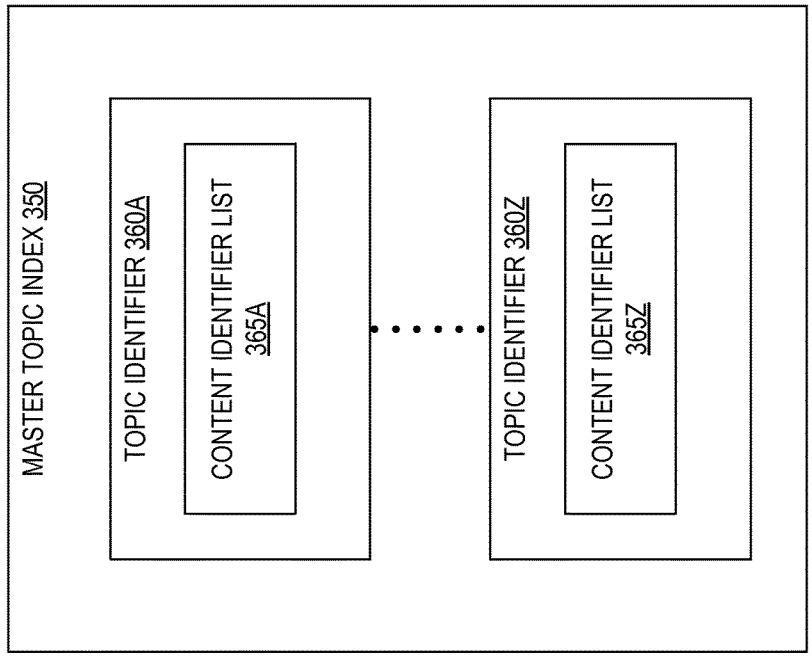
FIG. 3B is a block diagram illustrating a master topic index in accordance with an implementation of the disclosure.
Figure 3A:
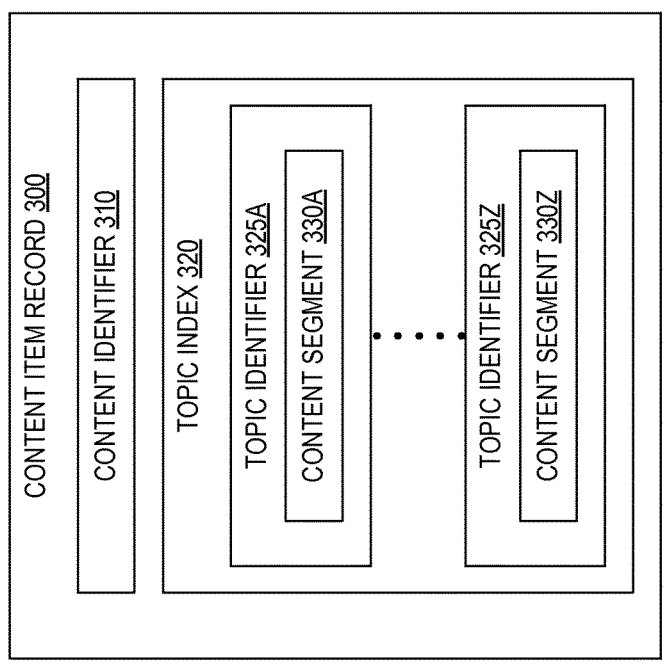
FIG. 3A is a block diagram illustrating a content item record including a topic index in accordance with an implementation of the disclosure.

FIGS. 3A and 3B illustrate different data structures for associating content items with topic indices. In one implementation, a content item record 300 may correspond to a single content item (e.g., one or more of the content item records 280A-280Z. The content identifier 310 may be a canonical identifier that may be used to locate or index the content item (e.g., if the content item is a movie, the content identifier 310 is a name of the movie). In some implementations, the content identifier 310 is a unique identifier of the content (e.g., a serial number). The content item record 300 also includes a topic index 320 which includes one or more topic identifiers 325A-325Z. Each of the topic identifiers 325A-325Z may be further associated with a content segment 330A-330Z of the content item. For example, if the content item is a video clip, the content segment 330A may correspond to portion of the clip that occurs within the video clip (e.g., a minute-long clip starting at the two-minute mark of the content item). Information relating to the size/length of the content segments 330A-330Z and locations within the content item may be included within the topic index 320, thus making the content item itself and the segments within the content item searchable by topic.

In some implementations, a master topic index 350 may be similar to the content item record 300, except that the master topic index includes multiple topic identifiers 360A-360Z that are associated with content identifier lists 365A-365Z, respectively. The content identifier lists 365A-365Z may include, for each content identifier in the lists, information related to the content, such as topic-relevant segments and their locations within their respective content items. In some implementations, the topic identifiers 360A-360Z may also include associated scores/rankings, which may be used to determine relevance of topics. Scoring of topics is described in greater detail with respect to FIG. 8.

In one implementation, the content generation module 258 illustrated in FIG. 2 may be utilized by the content indexing component 250 to generate content items from one or more other content items based on content indices associated with the one or more other content items. A generated content item may be an after-the-fact summarization or distillation of important moments of a conversational event as determined during or after the event, or it may be a real-time view of the summary of the important moments in the event as determined in real-time during the event. Content items generated after the fact and in real-time can be substantially different even when they pertain to the same event. The functionality of the content generation module 258 is described in greater detail with respect to FIGS. 5 and 7.

In general, functions described in one implementation as being performed by any of the conference server 120 or the NLP server 130 can also be performed by one or more of the client devices 110A-110Z in other implementations if appropriate. For example, the client device 110A may implement a software application that performs the functions of the content indexing component 250. In addition, the functionality attributed to a particular component can be performed by different or multiple components operating together. In some implementations, the NLP server 130 can be accessed as a service provided to other systems or devices through appropriate application programming interfaces.

The conference platform 200 and the content indexing component 250 were described as being implemented by the conference server 120 and the NLP server 130, respectively, but may be implemented by any of the client devices 110A-110Z, the conference server 120, or the NLP server 130. As an example, a client device (e.g., client device 110A) may be programmed to perform some or all of the functions of the conference platform 200 and/or the content indexing component 250. As another example, the conference platform 200 and content indexing component 250 may be combined together in the conference server. In implementations in which the conference platform 200 and/or the content indexing component 250 are implemented on a client device, any functions described with respect to the conference platform 200 and/or the content indexing component 250 that "receive", "transmit", "retrieve", "identify", "determine", etc., are understood to refer to functions performed by sub-systems or sub-modules within the client device rather than across a network (e.g., the network 105), as would be appreciated by one of ordinary skill in the art.

Figure 4:
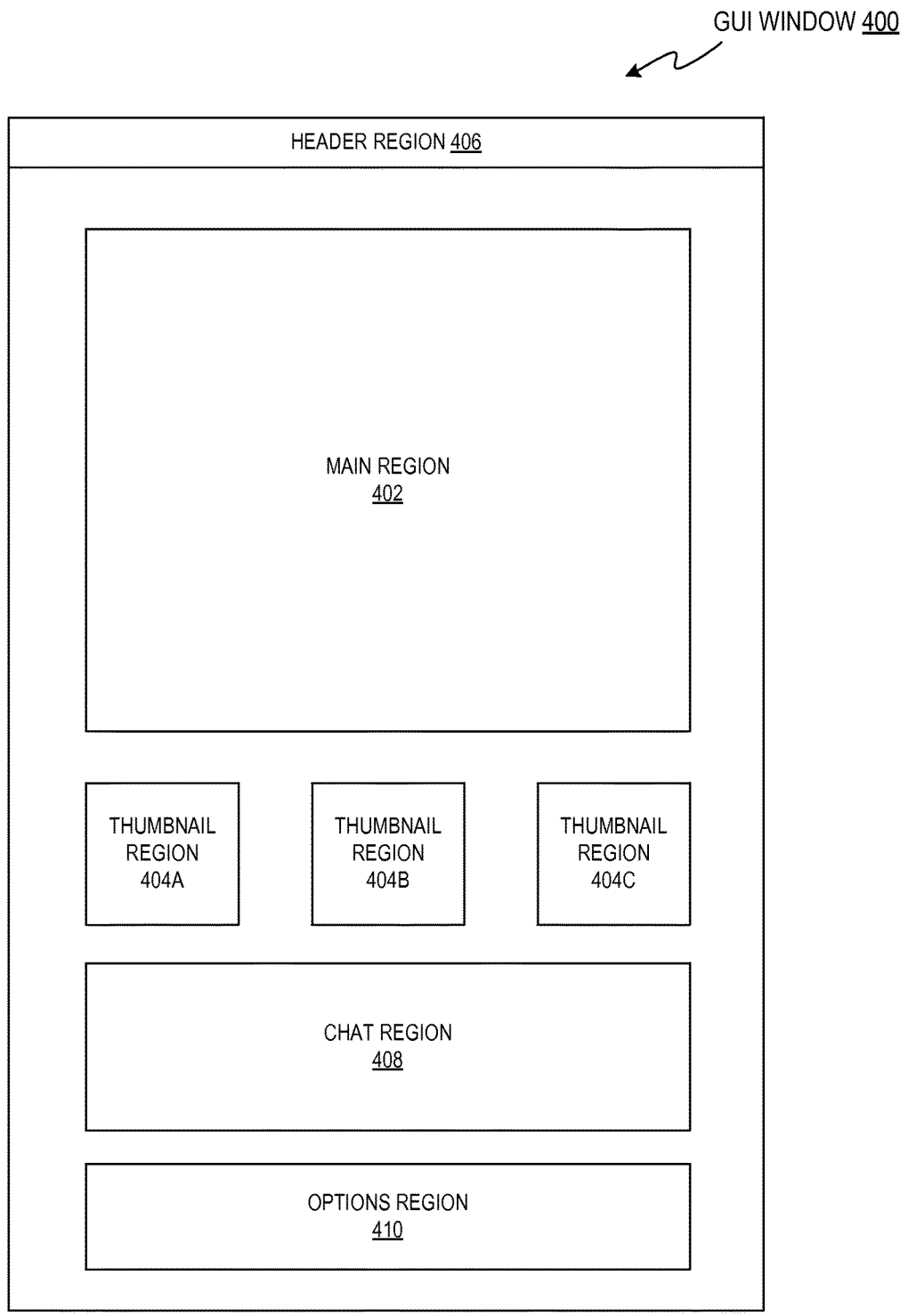
FIG. 4 is a block diagram illustrating an exemplary graphical user interface window of a media collaboration service/application in accordance with an implementation of the disclosure.

FIG. 4 is a diagram illustrating an exemplary graphical user interface (GUI) window 400 of a media collaboration service/application in accordance with an implementation of the disclosure. In one implementation, the GUI window 400 includes a main region 402, thumbnail regions 404A-404C, a header region 406, a chat region 408, and an options region 410. In some implementations, less than all of thumbnail regions 404A-404C may be present in the GUI window 400, or additional thumbnail regions may be present. The GUI window 400 may be generated for display as a user interface in combination with a media viewer of a client device (e.g., the user interface 111A and the media viewer 112A of the client device 110A).

In some implementations, each region can contain, depict, or otherwise present media content (e.g., video content) provided by a particular participant in a media collaboration. For example, the main region 402 may be a media player and may present a video stream transmitted by a first participant (e.g., a "room" of the first or primary participants in a videoconference, video clips shared by the first participant, etc.), while each of the thumbnail regions 404A-404C may contain a miniaturized version of video streams transmitted by one or more additional participants, static images (e.g., an avatar, etc.) associated with the additional participants, miniaturized versions of video streams associated with the additional participants, or combinations thereof. It should be noted that although the regions of the GUI window 400 are depicted as rectangular, one or more of the regions may have some other shape (e.g., a circle, a trapezoid, etc.). Moreover, the shape, size, and/or layout of the GUI window 400 may depend on the device on which the GUI window 400 is to be presented. For example, as illustrated in FIG. 4, the GUI window 400 is formatted in a way that is suitable for a mobile device.

In one implementation, each of the main region 402 and the thumbnail regions 404A-404C may be associated with video streams generated by respective client devices of one or more participants in the video collaboration (e.g., video conference participants). Moreover, in certain implementations, a particular region can change (e.g., from a thumbnail region to a major region) or swap the video streams displayed in the different regions depending on whether the participant associated with the region is speaking or not (e.g., using the interface module 204). Such a change can be performed automatically (e.g., without receiving any user request or detecting any user interaction). In some implementations, the conference platform 200 may receive the video streams and identify (e.g., using the interface module 204) which video stream corresponds to a current speaker or a focus of attention in general (e.g., the video stream corresponds to a participant that is hosting the media collaboration, a volume level of a speaker, a host selection of a particular participant, etc.). In some implementations, a client device that implements the GUI window 400 may receive a composite content stream (e.g., that includes video/audio stream data generated by one or more of the client devices 110A-110Z) that was generated by the interface module 204 of the conference platform 200. The client device may be configured to extract content (e.g., one or more video/audio streams) from the composite content stream. In one implementation, the composite content stream includes metadata that specifies geometric properties corresponding to regions of the GUI window 400, such that video streams can be extracted from the composite content stream and mapped to the appropriate regions within the GUI window 400.

In one implementation, one of the thumbnail regions 404A-404C may transform or transition into the main region 402 (e.g., in response to a participant selecting/clicking on the thumbnail region or otherwise activating the thumbnail region), and vice versa. In some implementations, when a particular participant is speaking during a video conference, a video stream of the participant may be displayed within the main region 402. For example, if a video stream corresponding to a first participant is displayed in the main region 402 and the first participant is not speaking, a second participant's video stream may be "promoted" from one of the thumbnail regions 404A-404C to the main region 402 while the first participant's video stream is "demoted" to one of the thumbnail regions 404A-404C.

In one implementation, the composite content stream may include real-time chat data. For example, the chat data may be displayed within the chat region 308. The chat region 308 may provide a user/participant the opportunity input chat messages and transmit the chat messages (e.g., to the conference server 120, which routes the chat messages to client devices of other participants). In one implementation, a list of available or related chats may be presented to the user. In one implementation, a list of topics associated with a chat discussion may be presented to the user. In response to receiving a user selection of one of the topics, the user may be presented with a list of similar chats related to the topic, or current chat discussion may scroll to a portion in which the selected topic was discussed.

In one implementation, the options region 410 may provide selectable options to a user. For example, the selectable options may allow the user to adjust settings of the media collaboration (e.g., display features, volume, etc.), invite additional users to participate in the media collaboration, receive content recommendations, provide content recommendations, rate or vote on the media collaboration and/or content presented during the media collaboration, request content related to a topic of the media collaboration (e.g., a currently discussed topic), etc. Options related to the generation and utilization of topic indices are described in greater detail with respect to FIG. 5.

Figure 5:
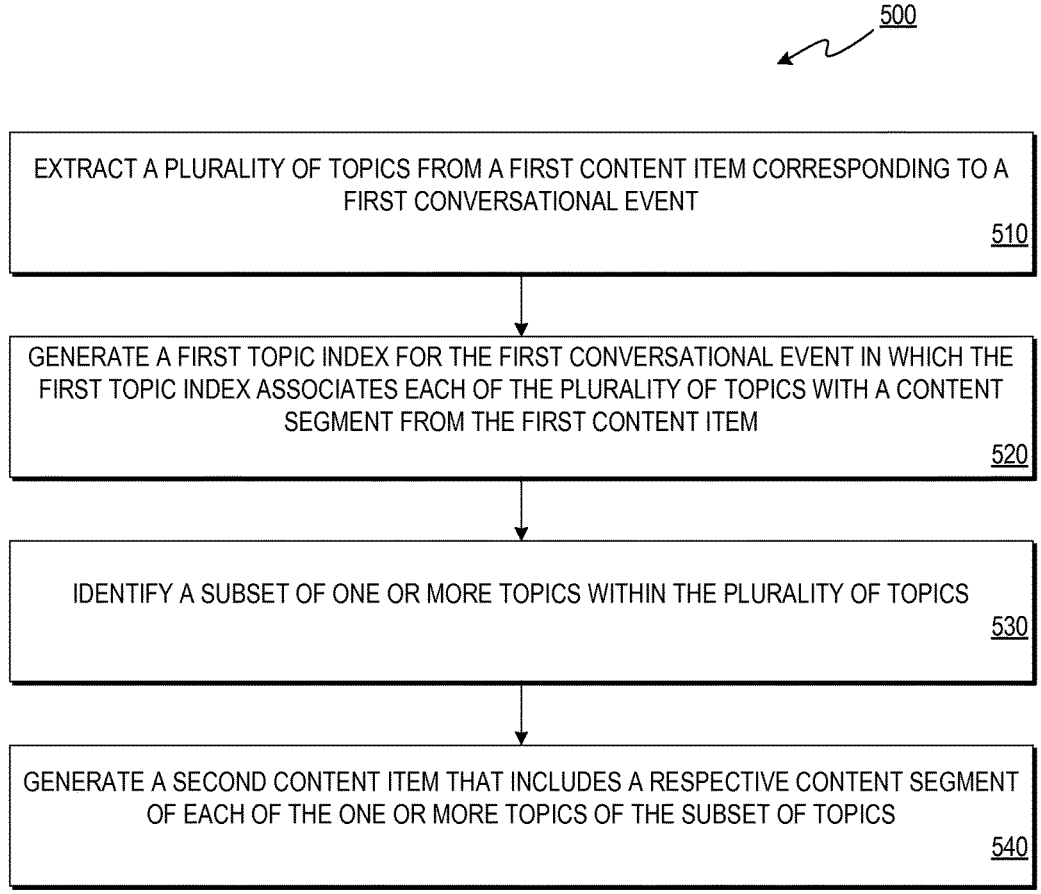
FIG. 5 is a flow diagram illustrating a method for generating a topic index for a conversational event in accordance with an implementation of the disclosure.
Figure 7A:
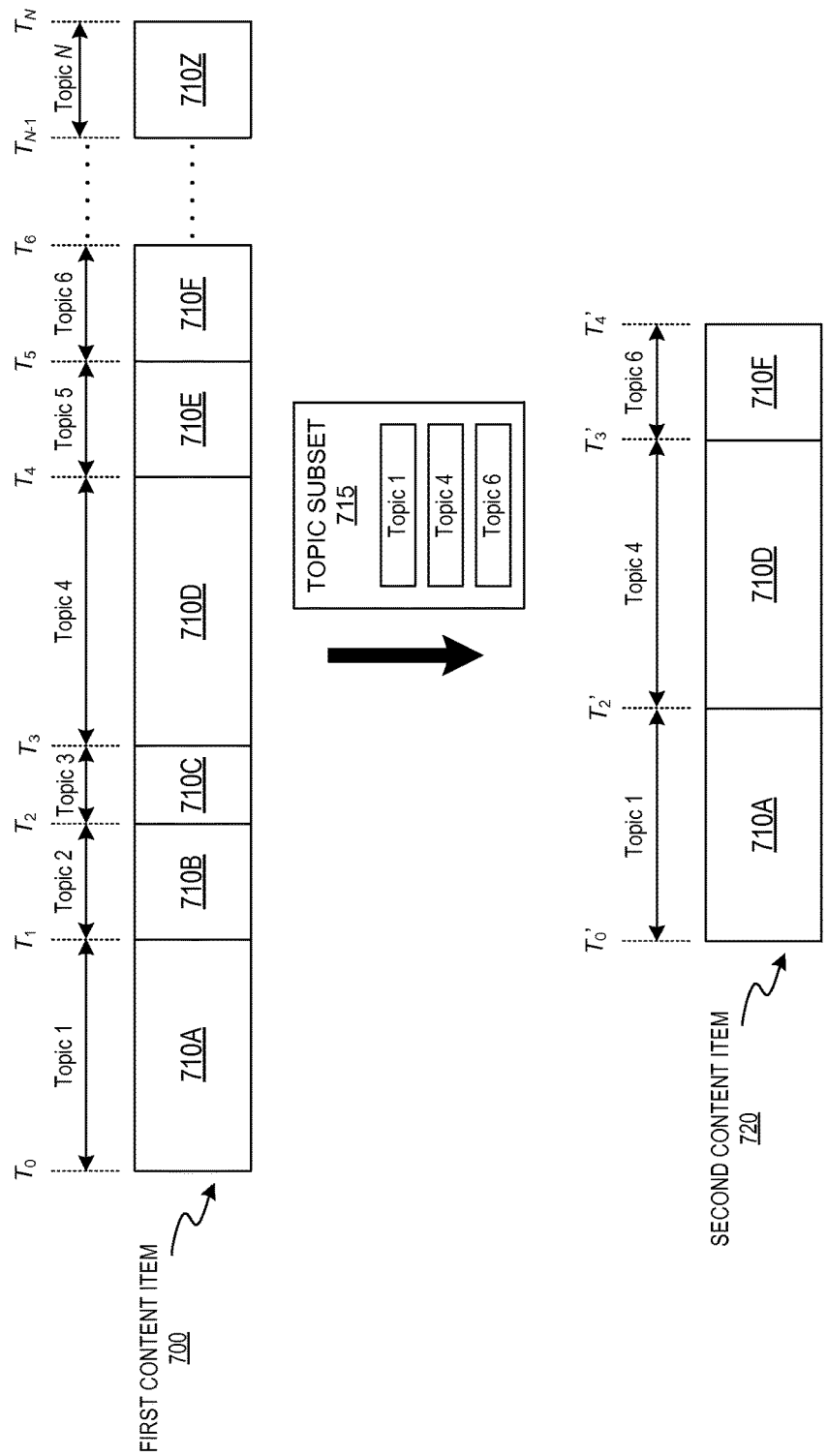
FIG. 7A is a block diagram illustrating the use of a topic index for generating a second media item from a first media item in accordance with an implementation of the disclosure.
Figure 7B:
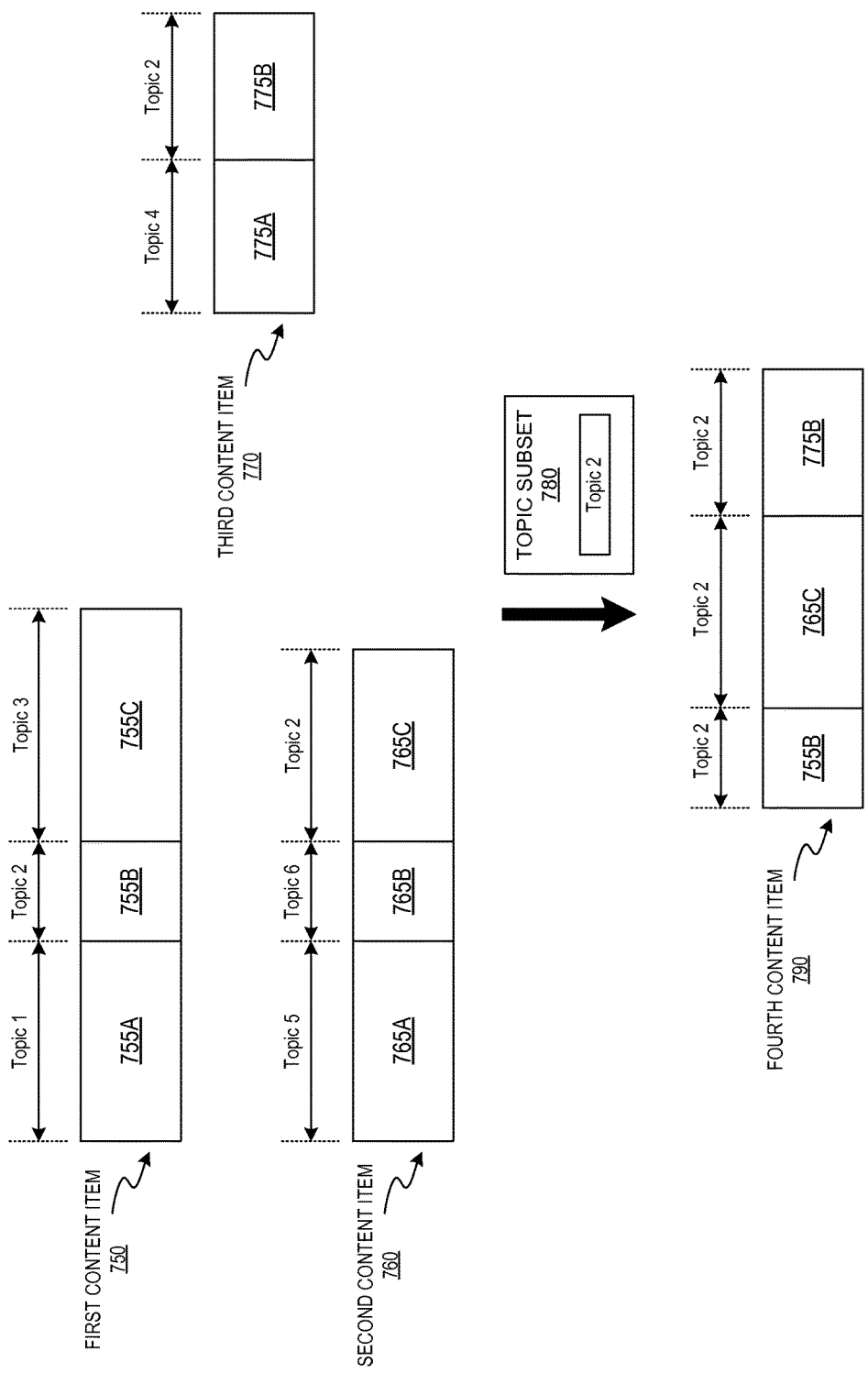
FIG. 7B is a block diagram illustrating the use of a topic index for generating a media item from multiple media items in accordance with an implementation of the disclosure.
Figure 8:
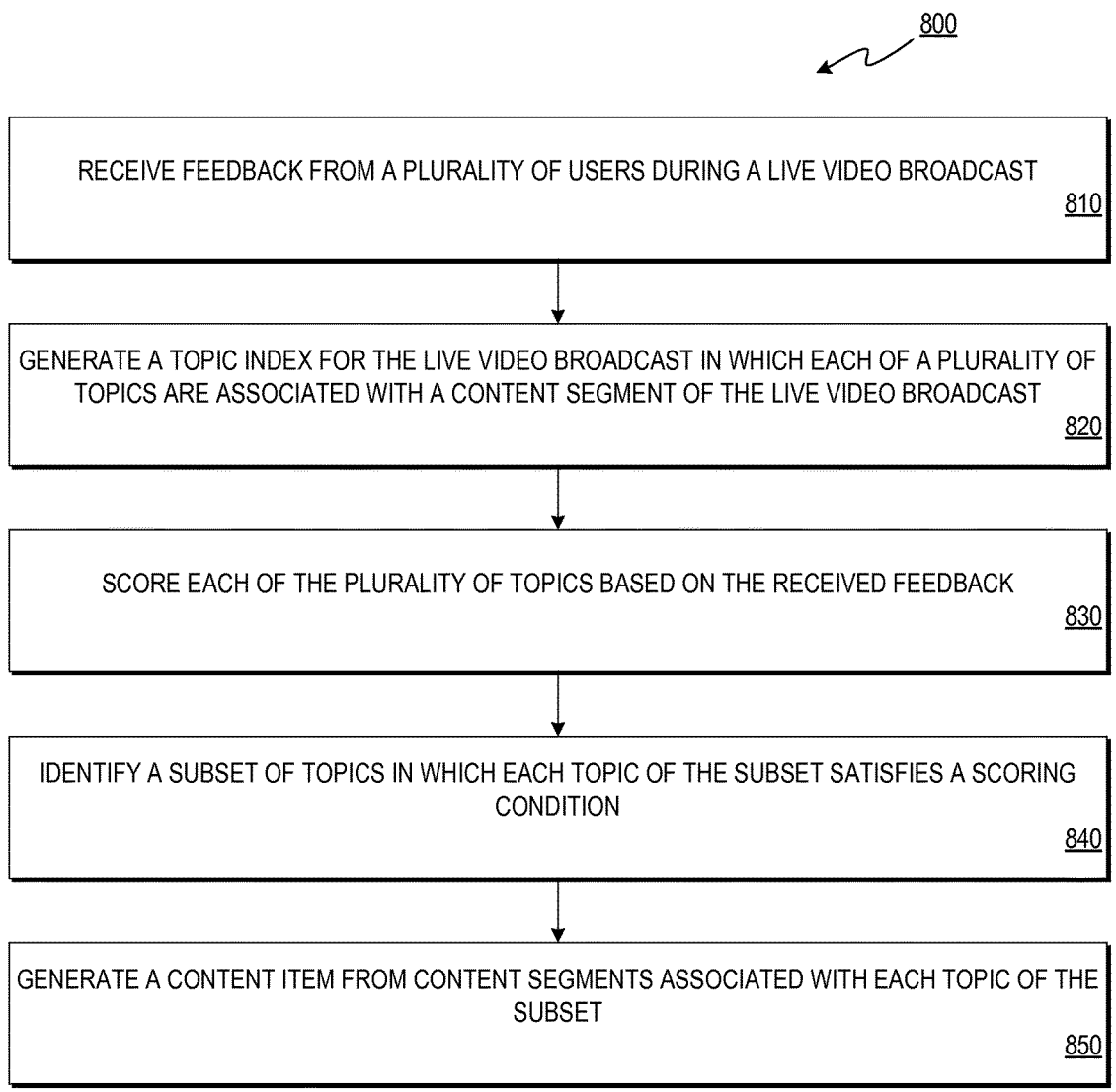
FIG. 8 is a flow diagram illustrating a method for ranking topics in accordance with an implementation of the disclosure.

FIG. 5 is a flow diagram illustrating a method 500 for generating a topic index for a conversational event in accordance with an implementation of the disclosure, and FIG. 8 is a flow diagram illustrating a method 800 for ranking topics in accordance with an implementation of the disclosure. The methods 500 and 800 may be performed by processing logic that includes hardware (e.g., circuitry, dedicated logic, programmable logic, microcode, etc.), software (e.g., instructions run on a processing device to perform hardware simulation), or a combination thereof. In some implementations, the methods 500 and 800 may be performed by the content indexing component 250 as described with respect to FIGS. 1 and 2. In describing the methods 500 and 800, reference is made to FIGS. 6, 7A, and 7B to illustrate various implementations. It is noted that the examples provided in FIGS. 6, 7A, and 7B are meant for illustrative purposes, and are not to be considered limiting implementations.

The operations of the methods 500 and/or 800 may be performed for a media collaboration, and in particular a conversational event (e.g., a video conference, an audio conference, a live video broadcast, a text-based chat, combinations thereof, etc.) according to various implementations of a system architecture (e.g., the system architecture 100). In one implementation, content streams, such as video streams generated/captured by client devices (e.g., client devices 110A-110Z) may be transmitted to a conference server (e.g., the conference platform 200 of the conference server 120), which are then transmitted to an NLP server (e.g., the content indexing component 250 of the NLP server 130) for topic extraction. In another implementation, the content streams are transmitted to the NLP server for topic extraction prior to being received by the conference server, and then transmitted to the client devices (e.g., as a composite content stream). In another implementation, a content stream is generated/captured by a first client device (e.g., the client device 110A), and transmitted to the conference server 120, which performs topic extraction. In another implementation, a content stream is generated/captured by a first client device (e.g., the client device 110A), and transmitted to one or more additional devices (in which the first client device and/or one or more of the additional client devices performs topic extraction).

Referring to FIG. 5, the method 500 begins at block 510 when a plurality of topics are extracted from a first content item corresponding to a first conversational event. In some implementations, block 510 is performed by the content extraction module 252 and the topic identification module 254. In one implementation, the first conversational event may correspond to a live video recording, a pre-recorded video, a video conference, a video chat, an audio conference, an audio chat, a text-based chat, or combinations thereof. In some implementations, if the conversational event includes an audio component, spoken language is transcribed into text (e.g., using the content extraction module 252), and a list of one or more topics may be extracted from the text using the topic identification module 254. In other implementations, if the conversational event is entirely text-based (such as a sequence of chat messages), topic identification may be performed directly without transcription. In some implementations, topic extraction occurs in real-time during the conversational event.

In one implementation, the conversational event may be a media collaboration accessible to multiple users via media collaboration interfaces (e.g., user interfaces 111A-111Z) implemented on respective client devices of the users. For example, a media collaboration interface may be similar to GUI window 600, as illustrated in FIG. 6. The GUI window 600 includes a main region 602 that may display a video stream associated with a participant in the conversational event, a live video stream, pre-recorded content (e.g., on-demand content), static images (e.g., in the form of a slideshow), a presentation with accompanying audio, combinations thereof, etc. Thumbnails 604A-604C may represent video streams of various participants in the media collaboration (e.g., a first participant associated with the thumbnail 604A, a second participant associated with the thumbnail 604B, etc.). In one implementation, a thumbnail version of the video stream of the main region 602 is displayed as a thumbnail (e.g., as the thumbnail 604C).

In some implementations, the main region 602 is a media player presenting a live video stream, which may be a video stream associated with a participant of the conversational event, a live broadcast, etc. In other implementations, content presented in the main region 602 may correspond to a pre-recorded video, a pre-recorded audio clip, a presentation, etc. In such implementations, the main region 602 may include a playback region 610, which may be displayed as an overlay over the main region 602 or adjacent to the main region 602. The playback region 610 includes a playback indicator 612 and a full-screen toggle 614 to switch the main region 602 between a full-screen mode and a windowed mode (as illustrated). An approval indicator 606 and a disapproval indicator 608 may also be presented (e.g., as an overlay over the main region 602, adjacent to the main region 602, etc.) to a user of the GUI window 600 to allow the user to rate the conversational event. In other implementations, the main region 602 is omitted entirely (e.g., if the conversational event does not include a video stream).

In some implementations, the GUI window 600 may include a chat window 616. Various participants of the conversational event may input messages at their respective client devices (e.g., using message field 618), which may be transmitted to a conference server (e.g., the conference server 120) and made available to some or all of the participants of the conversational event. In some implementations, the chat window 616 is displayed along with content presented in the main region 602.

Referring back to FIG. 5, at block 520, a first topic index is generated for the first conversational event (e.g., using the association module 256). The first topic index associates each of the plurality of topics with a content segment from the first content item. For example, a first content item record (e.g., one of content records 280A-280Z or content item record 300) is generated for the first conversational event, in which the first content item record includes a first content identifier (e.g., one of content identifiers 282A-282Z or content identifier 310) and a first topic index (e.g., one of topic indices 284A-284Z or topic index 320). The first topic index may have been generated prior to presenting the content to one or more users, may be generated in real-time while presenting the content, or may be generated after presenting the content. In one implementation, the generated topic index is added to a database of topic indices (e.g., stored in the data store 106), in which one or more of the topic indices of the database corresponds to a conversational event (e.g., content associated with the conversational event). Each conversational event of the database may be searchable by at least one respective topic of the conversational event. In some implementations, the topics and content segments may be associated with other data, such as an identity (e.g., username) of a speaker/writer who discussed the topic, a date/time at which the topic was discussed (e.g., a time at which discussion of the topic began, a relevant time duration in which the topic was discussed, etc.), sentiment data related to the topic (e.g., approval/disapproval by participants in the conversational event), an identity (e.g., username) of those expressing sentiment, or other related data. For example, a search may be performed to identify content segments related to topic T for which user A expressed negative sentiment.

In one implementation, if the content is pre-recorded content, a client device of a user may receive the content and present the content using the GUI window 600. The client device may also receive a content record associated with the content (e.g., the content identifier may be a canonical identifier that is used to identify the content), and the GUI window 600 may generate for display a list of topics from the topic index in a topic list 620.

In one implementation, if the content is live content (e.g., a live video stream, a live audio stream, a real-time chat, etc.), a content record may be generated for the content and the topic index may be updated in real-time as the content is streamed. For example, new topics may be added to the topic list 620 as the new topics are extracted from the content item of the conversational event (e.g., using the content extraction module 252 and the topic identification module 254). For example, if the content item is a live video stream (e.g., presented in the main region 602), topics may be extracted from the live video stream (e.g., by processing spoken language) and added to the topic index, which may be added to the topic list 620. As another example, if the content item is a chat (e.g., presented in the chat window 616), topics may be extracted from the chat messages and added to the topic index, which may be added to the topic list 620.

Referring back to FIG. 5, at block 530, a subset of topics is identified including one or more topics from the plurality of topics, with the designated topics, in some implementations, corresponding to topics designated as interesting. In some implementations, the subset may include a single topic. For example, a single topic may have been designated as being the most interesting topic based on user feedback.

In some implementations, the subset may include multiple topics. For example, the topics may have been designated as being among the most interesting topics based on user feedback. Identifying the subset of topics based on user feedback is described in greater detail with respect to FIG. 8. In some implementations, a content request may be received from a client device, with the content request including a topic indicator and an identifier of a speaker (e.g., who may be a speaker associated with the topic). The subset of topics may be identified based on the topic indicator and the identifier of the speaker.

At block 540, a second content item is generated. The second content item includes respective content segments (content segments of the first content item) of each of the topics of the subset. As an example, FIG. 7A illustrates the first content item 700 as having been indexed according to a topic index (e.g., the first topic index described with respect to FIG. 5). The first content item 700 may have been indexed based on N topics (topic 1 to topic N) such that each of content segments 710A-710Z correspond to one or more of the N topics. In some implementations, more than one of the content segments 710A-710Z may correspond to the same topic (e.g., content segment 710B and content segment 710F may both correspond to the topic "dinosaurs"). In some implementations, the same topic may occur multiple times in a particular content item.

In some implementations, each of the content segments 710A-710Z may correspond to content segments of a video stream (e.g., a live video stream or a pre-recorded video stream), an audio stream (e.g., a live audio stream or a pre-recorded audio stream), a presentation (e.g., a slideshow), or text-based chat. For example, if the first content item is a video and/or audio stream, each content segment 710A-710Z may have a start time and end time (e.g., content segment 710A has a start time of $T_0$ and an end time of $T_1$). The start and end times of each of the content segments 710A-710Z may be stored with the topic index such that relevant times within the first content item can be located by topic. As another example, if the first content item is a slideshow, the content segments 710A-710Z may each correspond to one or more slides of the slideshow. As another example, if the first content item is a text-based chat, the content segments 710A-710Z may each correspond to one or more messages of the text-based chat (e.g., one or more messages displayed in chat window 616). In some implementations, each of the content segments 710A-710Z may correspond to consecutive and adjacent sequences within the first content item 700 such that content the segments 710A-710Z collectively define the first content item (e.g., each segment is a video clip of a video that together form the entire video). In some implementations, the content segments 710A-710Z may correspond to segments for which topics have been associated such that content segments 710A-710Z do not collectively define the first content item 700 in its entirety (e.g., "topic-less" segments of the first content item are not indexed).

The subset of topics includes topic identifiers that are used to identify content segments that correspond to the topic identifiers. For example, if a topic subset 715 includes topics 1, 4, and 6, the content generation module 258 may generate a second content item 720 that includes content segments that correspond to topics 1, 4, and 6, namely content segments 710A, 710D, and 710F, respectively. The generated content item may be stored (e.g., in the data store 106) and/or transmitted to a client device (e.g., one of the client devices 110A-110Z) that requested to have the content item generated (e.g., the client device may have submitted a request for a highlights reel of the first content item 700). In one implementation, the content segments 710A, 710D, and 710F may be arranged chronologically in the second content item 720 based on one or more of relevance of the content segments (e.g., user-generated scores/ratings), time duration of the content segments, a human editor, etc.

In one implementation, a master topic index (e.g., the master topic index 350) may be used to generate a content item from multiple content items, as illustrated in FIG. 7B, so as to produce a montage of topic-related portions/clips from the multiple content items. A first content item 750 may include content segments 755A-755C, in which each corresponds to topics 1, 2, and 3, respectively. Similarly, a second content item 760 and a third content item 770 may each include content segments 765A-765C and content segments 775A-775B, respectively. A topic subset 780 includes a single topic (topic 2), although more than one topic may be included in the subset. A fourth content item 790 may be generated that includes content segments 755B, 765C, and 775B. In one implementation, the content segments 755B, 765C, and 775B may be arranged chronologically in the fourth content item 790 based on one or more of relevance of the content segments (e.g., user-generated scores/ratings), time duration of the content segments, a human editor, etc.

In one implementation, a content request that includes at least one topic indicator may be received (e.g., at the client device based on user selection from topic list 620). The at least one topic indicator may be used to identify a subset of topics within the topic index. In some implementations, the content request may result in the generation of a content item, as described above with respect to block 540, and the generated content item may be transmitted to the client device of the user (e.g., for presentation within the GUI window 600). In other implementations, the content request may alter the content presented to the user in the GUI window 600 without necessarily resulting in the generation of a new content item. A user may select one or more topic indicators from the topic list 620 of the GUI window 600 (e.g., topic indicator 622), which may automatically serve as a content request. In some implementations, the request may cause currently presented content to move to or play back from a portion related to the selected topic. For example, if the topic indicator 622 is selected, one or more of the main region 602 or the chat window 616 may present a portion of content related to the topic. For example, a video stream of 602 may begin playback from an earlier portion in which the topic corresponded to "dinosaurs". As another example, the chat window 616 may scroll up to an earlier portion in which the topic corresponded to "dinosaurs", as illustrated in FIG. 6.

In some implementations, the GUI window 600 may include an option 624. The user may select the option 624 to find similar content (e.g., based on one or more selected topics or most relevant topics of the conversational event), and the client device may submit a search request for content (e.g., to the conference server or to another source). For example, the GUI window 600 may display a list of similar content (e.g., other videos related to a current or selected topic) and/or automatically present different content to the user (e.g., in the main region 602).

In some implementations, the GUI window 600 may include an option 626. The user may select the option 626 to find other chats that are similar to the current chat. For example, in response to a user selection of option 626, the GUI window 600 may display a list of other available chats and/or automatically transfer the user to another chat based on the current chat topic, the selected chat topic, etc. For example, if the current topic (based on a topic index that is being updated in real-time) is "dinosaurs", the user may be presented with an option to join a different chat related to "dinosaurs".

In some implementations, the GUI window 600 may include an option 628. The user may select the option 628 to search for topics. For example, the GUI window 600 may present the user with an input field for which the user may enter a topic to search for. In one implementation, the topic is transmitted to the NLP server, which identifies content items from a master topic index (e.g., the master topic index 350) and returns a list of content items (which may include one or more of video, audio, or text-based content items). The list of content items may then be presented for display by the GUI window 600.

In some implementations, the GUI window 600 may include an option 630. The user may select the option 630 to watch a highlights reel. For example, the currently displayed content (e.g., in the main region 602, in the chat window 616, etc.) may be replaced with a highlights reel for that content that shows interesting portions of the content while omitting less interesting portions. The highlights reel may have been generated for the content in a similar fashion as described with respect to FIG. 7A. Interesting portions of the content may be determined according to various implementations, such as those described with respect to FIG. 8.

In some implementations, the GUI window 600 may include a recommendation region 632 for recommending content. For example, a content recommendation may be generated based on topics from a topic index associated with the conversational event (e.g., a current topic of the conversational event, a topic selected by a user, etc.).

Referring to FIG. 8, the method 800 begins at block 810 when feedback is received from a plurality of users during a live video broadcast. It is noted that the method 800 is not limited to live video broadcasts, and may also be adapted for pre-recorded content and the like. In one implementation, the feedback is received during the live video broadcast. For example, users of client devices receiving the live video broadcast may indicate approval or disapproval during the live video broadcast. For example, a user of a client device implementing the GUI window 600 may click on one of approval indicator 606 or disapproval indicator 608 one or more times during the broadcast of the live video feed. As another example, approval or disapproval may be determined based on comments made during the conversational event verbally (e.g., the user vocalizes their approval/disapproval), non-verbally (e.g., if the user types in the message field 618 that he/she likes/dislikes the content being presented in the main region 602, switches to different content, designates the content as "favorite content", etc.), etc. Approval or disapproval data may be collected by a conference server (e.g., the conference server 120) or an NLP server (e.g., the NLP server 130).

At block 820, a topic index is generated for the live video broadcast in which each of a plurality of topics is associated with a content segment of the live video broadcast (e.g., a first topic is associated with a first content segment, a second topic is associated with a second content segment, etc.). The topic index may be generated (e.g., using the association module 256) in accordance with any of the implementations described herein, such as those described with respect to FIG. 5 (e.g., block 520).

At block 830, each of the plurality of topics is scored based on the received feedback from the plurality of users. In some implementations, scores may be mapped to particular topics based on the timing at which a user provides his/her approval or disapproval. For example, if a user selection of the approval indicator 606 is selected during a time duration defined by $T_1$ and $T_2$ of the first content item 700 of FIG. 7A, then this may serve as an indicator of approval for topic 2. In some implementations, a score may be computed for a topic as a difference between a number of times an approval indication has been received for the topic and a number of times a disapproval indication has been received for the topic (e.g., for approval and disapproval indications collected from multiple client devices). In other implementations, other ways of scoring the topics may be utilized. For each topic, a score generated for the topic may be stored in a topic index (e.g., stored with a respective topic identifier 325A-325Z, or with a respective topic identifier 360A-360Z).

At block 840, a subset of topics is identified from the plurality topics. For example, a topic from the plurality of topics is identified by determining that the topic satisfies a scoring condition. All such topics that satisfy the scoring condition may be included in the subset. In some implementations, the scoring condition may be that the topic exceeds a threshold score. In some implementations, the scoring condition may be that the topic is ranked above a threshold rank (e.g., topics identified correspond to the top 10 highest scored topics). In some implementations, a human editor may determine whether more or less topics should be added to the subset of topics (e.g., using one of the client devices 110A-110Z).

At block 850, a content item is generated from content segments associated with each topic of the subset. The content item may be generated in accordance with any of the implementations described herein, such as those described with respect to FIG. 5 (e.g., block 540) and FIGS. 7A and 7B.

For simplicity of explanation, the various implementations of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the implementations of the methods disclosed in this specification are capable of being stored on an article of manufacture to facilitate transporting and transferring such methods to computing devices. The term "article of manufacture", as used herein, is intended to encompass a computer program accessible from any computer-readable device or storage media.

Figure 9:
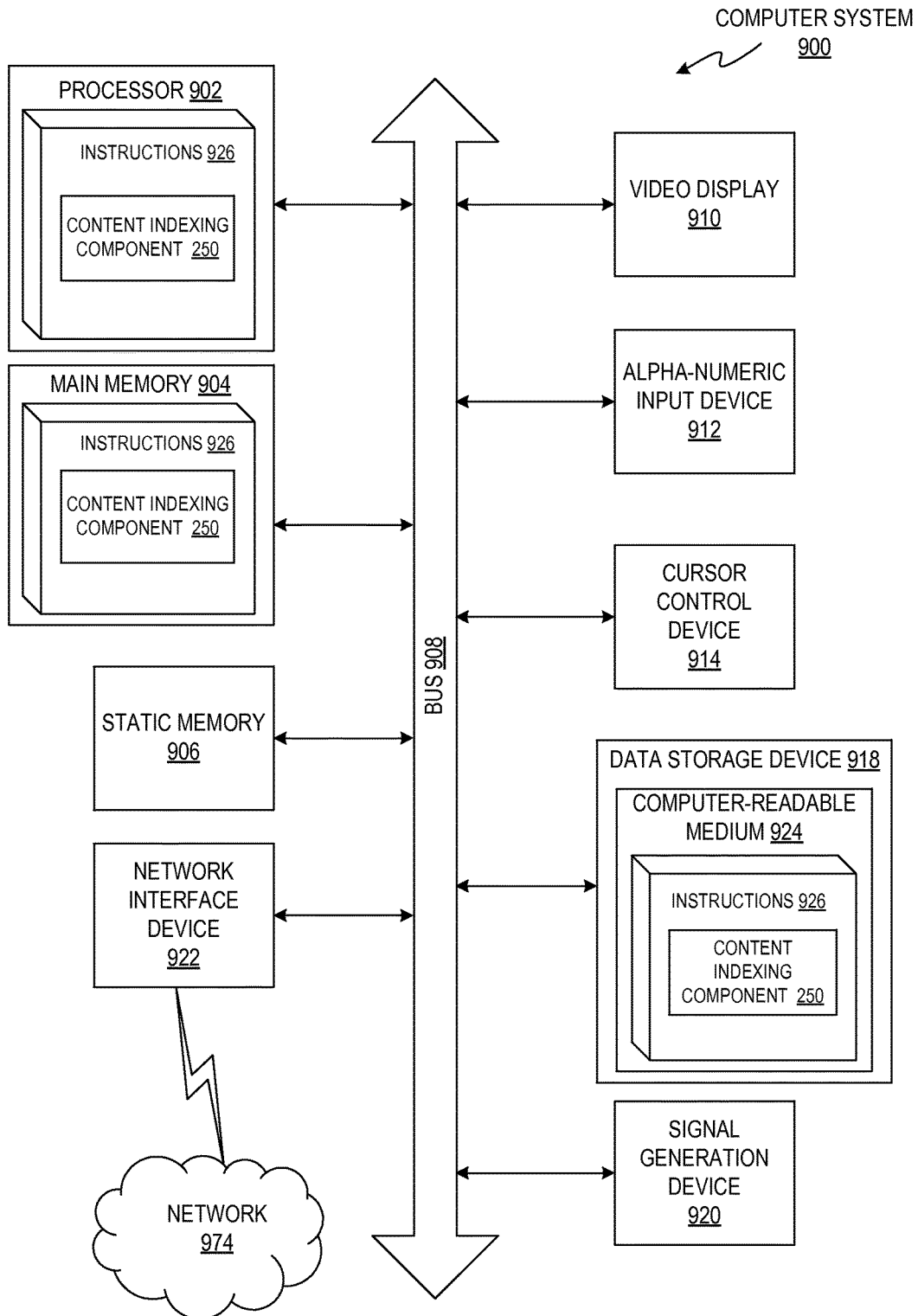
FIG. 9 is a block diagram illustrating an exemplary computer system in accordance with an implementation of the disclosure.

FIG. 9 illustrates a diagrammatic representation of a machine in the exemplary form of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 900 may be utilized by or illustrative of one or more of the client devices 110A-110Z, the data store 106, the conference server 120, the NLP server 130, or the natural language database 140.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a DSP, network processor, or the like. The processor 902 is configured to execute instructions 926 for performing the operations and steps discussed herein.

The computer system 900 may further include a network interface device 922. The computer system 900 also may include a video display unit 910 (e.g., a liquid crystal display (LCD), a cathode ray tube (CRT), or a touch screen), an alphanumeric input device 912 (e.g., a keyboard), a cursor control device 914 (e.g., a mouse), and a signal generation device 920 (e.g., a speaker).

The data storage device 918 may include a non-transitory computer-readable storage medium 924 on which is stored one or more sets of instructions 926 (e.g., software) embodying any one or more of the methodologies or functions described herein. The instructions 926 may also reside, completely or at least partially, within the main memory 904 and/or within the processor 902 during execution thereof by the computer system 900, the main memory 904 and the processor 902 also constituting computer-readable storage media. The instructions 926 may further be transmitted or received over a network 974 (e.g., the network 105) via the network interface device 922.

In one implementation, the instructions 926 include instructions for one or more content indexing components 250, which may correspond to the identically-named counterpart described with respect to FIGS. 1 and 2. While the computer-readable storage medium 924 is shown in an exemplary implementation to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory computer-readable storage medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "transmitting", "generating", "causing", "adding", "substracting", "inserting", "including", "removing", "extracting", "analyzing", "determining", "enabling", "identifying", "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation. Moreover, it is noted that the "A-Z" notation used in reference to certain elements of the drawings is not intended to be limiting to a particular number of elements. Thus, "A-Z" is to be construed as having one or more of the element present in a particular implementation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   extracting, by a processing device, a plurality of topics from a first content item corresponding to a conversational event, wherein the first content item comprises video between a plurality of users using respective client devices of the plurality of users as part of the conversational event;
   generating, by the processing device, a first topic index for the conversational event, wherein the first topic index associates each of the plurality of topics with a corresponding content segment from the first content item;
   receiving a content request for content from the conversational event, wherein the content request comprises a topic indicator that is part of the conversational event, an identifier of a speaker associated with the first content item, the speaker being one of the plurality of users in the first content item, and a sentiment of the speaker when discussing the topic indicator;
   identifying, by the processing device, a first subset of one or more topics within the plurality of topics based on the topic indicator, the identifier of the speaker, and the sentiment of the speaker when discussing the topic indicator;

generating, by the processing device, a second content item comprising a respective content segment of the first content item, the respective content segment corresponding to each of the one or more topics of the first subset; and providing, by the processing device, a topic list from the first topic index and the second content item for presentation in a user interface (UI) of the conversational event.

2. The method of claim 1, wherein the sentiment of the speaker included in the content request specifies approval or disapproval.

3. The method of claim 1, further comprising:
receiving a selection of a first topic from the topic list in the UI; and
transmitting at least a portion of the second content item, wherein the portion corresponds to a time within the conversational event when the first topic was discussed.

4. The method of claim 1, wherein the first content item is a live video broadcast, and wherein the method further comprises:
receiving feedback from the plurality of users of the first content item during the live video broadcast; and
generating a score for each of the plurality of topics based on the feedback, wherein identifying the first subset of one or more topics comprises, for each of the one or more topics: including a topic in the first subset of one or more topics in response to determining that a respective score of the topic satisfies a scoring condition, wherein satisfying the scoring condition comprises at least one of satisfaction of a threshold rank or being ranked above the threshold rank.

5. The method of claim 1, further comprising:
adding the first topic index to a database of topic indices, each topic index of the database of topic indices corresponding to one of a plurality of conversational events, wherein each of the plurality of conversational events are searchable by at least one respective topic of the conversational event.

6. The method of claim 5, further comprising:
receiving one or more topic indicators;
identifying a second subset of the plurality of conversational events based on the one or more topic indicators; and
for each conversational event of the second subset, identifying one or more corresponding content segments corresponding to the one or more topic indicators, wherein generating the second content item comprises generating the second content item from the one or more corresponding content segments.

7. The method of claim 1, wherein the first topic index is generated in real-time during the conversational event.

8. The method of claim 1, wherein the conversational event is one of a live video recording, a pre-recorded video, a video chat, a video conference, or a text-based chat.

9. A system comprising:
a memory; and
a processing device communicatively coupled to the memory, wherein the processing device is operable to:
extract a plurality of topics from a first content item corresponding to a conversational event, the first content item comprising video representing a communication exchange between a plurality of users using respective client devices of the plurality of users as part of the conversational event;
generate a first topic index for the conversational event, wherein the first topic index associates each of the plurality of topics with a corresponding content segment from the first content item;
receive a content request for content from the conversational event, wherein the content request comprises a topic indicator that is part of the conversational event, an identifier of a speaker associated with the first content item, the speaker being one of the plurality of users in the first content item, and a sentiment of the speaker when discussing the topic indicator;
identify a first subset of one or more topics within the plurality of topics based on the topic indicator, the identifier of the speaker, and the sentiment of the speaker when discussing the topic indicator;
generate a second content item comprising a respective content segment of the first content item, the respective content segment corresponding to each of the one or more topics of the first subset; and
providing a topic list from the first topic index and the second content item for presentation in a user interface (UI) of the conversational event.

10. The system of claim 9, wherein the sentiment of the speaker included in the content request specifies approval or disapproval.

11. The system of claim 9, wherein the processing device is further operable to:
receive a selection of a first topic from the topic list in the UI; and
transmit at least a portion of the second content item, wherein the portion corresponds to a time within the conversational event when the first topic was discussed.

12. The system of claim 9, wherein the first content item is a live video broadcast, and wherein the processing device is further operable to:
receive feedback from the plurality of users of the first content item during the live video broadcast;
generate a score for each of the plurality of topics based on the feedback; and
for each of the plurality of topics: include a topic in the first subset of one or more topics in response to determining that a respective score of the topic satisfies a scoring condition, wherein satisfying the scoring condition comprises at least one of satisfaction of a threshold rank or being ranked above the threshold rank.

13. The system of claim 9, wherein the processing device is further operable to:
add the first topic index to a database of topic indices, each topic index of the database of topic indices corresponding to one of a plurality of conversational events, wherein each of the plurality of conversational events are searchable by at least one respective topic of the conversational event.

14. The system of claim 13, wherein the processing device is further operable to:
receive one or more topic indicators;
identify a second subset of the plurality of conversational events based on the one or more topic indicators;
for each conversational event of the second subset, identify one or more corresponding content segments corresponding to the one or more topic indicators; and
generate the second content item from the one or more corresponding content segments.

15. A non-transitory computer-readable storage medium having instructions stored thereon that, when executed by a processing device, cause the processing device to perform operations comprising:

extracting a plurality of topics from a first content item corresponding to a conversational event, the first content item comprising video representing a communication exchange between a plurality of users using respective client devices of the plurality of users as part of the conversational event;

generating a first topic index for the conversational event, wherein the first topic index associates each of the plurality of topics with a corresponding content segment from the first content item;

receiving a content request for content from the conversational event, wherein the content request comprises a topic indicator that is part of the conversational event, an identifier of a speaker associated with the first content item, the speaker being one of the plurality of users in the first content item, and a sentiment of the speaker when discussing the topic indicator;

identifying a first subset of one or more topics within the plurality of topics based on the topic indicator, the identifier of the speaker, and the sentiment of the speaker when discussing the topic indicator;

generating a second content item comprising a respective content segment of the first content item, the respective content segment corresponding to each of the one or more topics of the first subset; and providing a topic list from the first topic index and the second content item for presentation in a user interface (UI) of the conversational event.

16. The non-transitory computer-readable storage medium of claim 15, wherein the sentiment of the speaker included in the content request specifies approval or disapproval.

17. The non-transitory computer-readable storage medium of claim 15, wherein the operations further comprise:

receiving a selection of a first topic from the topic list in the UI; and transmitting at least a portion of the second content item, wherein the portion corresponds to a time within the conversational event when the first topic was discussed.

18. The non-transitory computer-readable storage medium of claim 15, wherein the first content item is a live video broadcast, and wherein the operations further comprise:

receiving feedback from the plurality of users of the first content item during the live video broadcast; and generating a score for each of the plurality of topics based on the feedback, wherein identifying the first subset of one or more topics comprises, for each of the plurality of topics: including a topic in the first subset of one or more topics in response to determining that a respective score of the topic satisfies a scoring condition, wherein satisfying the scoring condition comprises at least one of satisfaction of a threshold rank or being ranked above the threshold rank.

19. The non-transitory computer-readable storage medium of claim 15, wherein the operations further comprise:

adding the first topic index to a database of topic indices, each topic index of the database of topic indices corresponding to one of a plurality of conversational events, wherein each of the plurality of conversational events are searchable by at least one respective topic of the conversational event.

20. The non-transitory computer-readable storage medium of claim 19, wherein the operations further comprise:

receiving one or more topic indicators;

identifying a second subset of the plurality of conversational events based on the one or more topic indicators; and for each conversational event of the second subset, identifying one or more corresponding content segments corresponding to the one or more topic indicators, wherein generating the second content item comprises generating the second content item from the one or more corresponding content segments.

\* \* \* \* \*